United States Patent
Douglis et al.

(10) Patent No.: US 7,725,536 B2
(45) Date of Patent: *May 25, 2010

(54) METHOD AND APPARATUS FOR LIMITING REUSE OF DOMAIN NAME SYSTEM INFORMATION

(75) Inventors: Frederick Douglis, Basking Ridge, NJ (US); Michael Rabinovich, Gillette, NJ (US); Oliver Spatscheck, Randolph, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 4 days.

This patent is subject to a terminal disclaimer.

(21) Appl. No.: 12/259,887

(22) Filed: Oct. 28, 2008

(65) Prior Publication Data

US 2009/0070453 A1   Mar. 12, 2009

Related U.S. Application Data

(63) Continuation of application No. 10/798,076, filed on Mar. 11, 2004, now Pat. No. 7,444,371.

(51) Int. Cl.
*G06F 15/16* (2006.01)
*G06F 15/173* (2006.01)
(52) U.S. Cl. .................. 709/203; 709/245; 709/225
(58) Field of Classification Search .............. None
See application file for complete search history.

(56) References Cited

U.S. PATENT DOCUMENTS

| 7,299,491 B2 * | 11/2007 | Shelest et al. ............... 726/4 |
| 2001/0049741 A1 * | 12/2001 | Skene et al. ............ 709/232 |
| 2003/0149581 A1 * | 8/2003 | Chaudhri et al. .......... 705/1 |

* cited by examiner

*Primary Examiner*—John B. Walsh
(74) *Attorney, Agent, or Firm*—Hoffman & Baron, LLP

(57) ABSTRACT

A method of limiting reuse of domain name information is disclosed. In accordance with the method, domain name information is received at a first domain name sewer. The domain name information includes a time limit and a request limit associated with subsequent distribution of the domain name information to at least one requestor. The received domain name information is validated from a second domain name server based on earliest expiration of the time limit and the request limit.

20 Claims, 5 Drawing Sheets

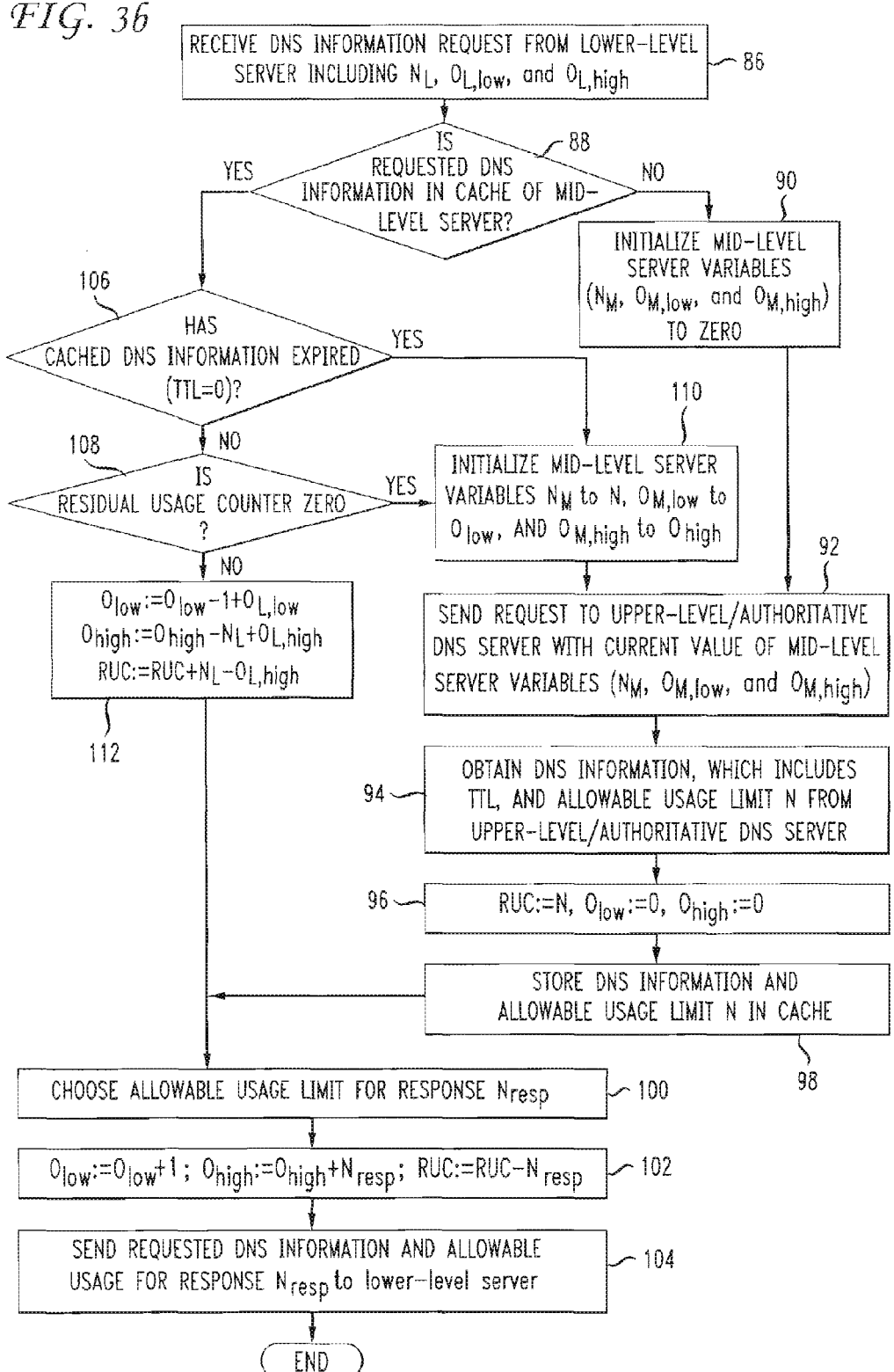

METHOD AND APPARATUS FOR LIMITING REUSE OF DOMAIN NAME SYSTEM INFORMATION

CROSS-REFERENCE TO RELATED APPLICATION

This application is a continuation of U.S. application Ser. No. 10/798,076 filed Mar. 11, 2004 now U.S. Pat. No. 7,444,371, which is incorporated herein by reference.

TECHNICAL FIELD

The present invention relates generally to computer network systems, and more particularly to a method and apparatus for limiting the reuse of domain name system information, such as internet protocol (IP) addresses assigned to a particular domain name, which is periodically validated.

BACKGROUND OF THE INVENTION

The domain name system (DNS) is an integral part of the Internet and other networks that use Internet-type protocols and architectures, such as transmission control protocol internet protocol (TCP/IP). The primary function of the domain name system is to permit users to access information on different computers connected to the Internet by simply typing or selecting text names, without regard to the sequence of numbers that specify the actual machine addresses or the name servers where the information to be accessed is located.

Thus, DNS is responsible for mapping an ASCII hostname, such as www.research.att.com to an IP address, such as 192.20.225.10. In some cases, different IP addresses are returned in response to different queries, which may be a function of information, such as load and network location. In addition, a single response can provide multiple IP addresses.

The entire database that is accessible over the Internet is divided into zones, which are distributed among name servers. The essential task of a name server is to answer queries using data in its zone. The reliability of the system and the information contained therein is of paramount importance. Consequently, and in order to ensure continued reliability, the DNS requires that at least two name servers within a zone contain data derived from an authoritative server, i.e., authoritative data. The two name servers may be denominated primary and secondary servers, or, as referred to herein, higher level DNS servers and lower level DNS servers. One of the chief responsibilities of name servers is to load the database files and maintain cached data acquired through resource records. Each resource record contains a so-called "time-to-live" field, which ensures that name servers do not cache data without a time bound.

The DNS is a hierarchical service, in which one DNS server can obtain information from another and then reuse that information repeatedly until a time-based threshold is reached. The time-based threshold is referred to as "time-to-live" or TTL. Normally, a local DNS server acts on behalf of clients by requesting DNS records, caching them, and then serving them to other clients for a period of time, known as the TTL, without revalidating the information. When an Internet user makes a request for a domain name record or information from a DNS server within the DNS, the DNS server must obtain the requested information or record and send it to the requesting party.

One method of accomplishing this task is for the server to check its cache memory for a local list of domain names already matched to machine addresses. If the requested domain name is in cache, then the computer can respond with an answer in the form of the associated machine address within a very short period of time. Such a local list is referred to as a name cache. It is generally stored in random access memory, disk storage, or another storage device coupled to the name server computer. The name cache is updated periodically from other name servers in the Internet.

When a DNS server caches the data, it builds up a database with relevant information that may be useful the next time the same or a similar query is received. Essentially, once the information is cached, the name server acquires significant knowledge about the data and whether it is responsive to a particular query or class of queries. Thus, once the information is cached, the process of obtaining the data is shortened significantly because the server now has the answer to the query in its cache. This leads to greater efficiency and enhanced performance, insofar as the cached information can be used for future inquiries. The resolution of data that is already in the local cache is considerably more efficient than a remote resolution that requires maneuvering through network traffic. However, there is a tradeoff. There is a very real possibility that the cached information may become outdated by the time it is used.

The local DNS server may serve a small number of clients, or an enormous community. Until the TTL expires, the local DNS will continue to use and distribute the same information. On the one hand, with a short TTL, the information will be fairly current, even with many clients using the specified host, because a new host can be selected before the load peaks too dramatically.

However, revalidating the information and establishing a new TTL requires that queries be sent to the authoritative server linked to the local DNS server. Thus, while the information will be current, some of these clients must wait for a round-trip between the local DNS and the authoritative DNS. On the other hand, with a longer TTL, the DNS lookup is amortized over more lookups, and fewer clients must wait, but the server may become overloaded before a new host is used.

Originally, DNS was intended to be static, that is, a hostname-to-IP address assignment would rarely change and would certainly not be different for different hosts requesting the same information. With the advent of DNS being used for geographic load balancing, DNS is much more dynamic, but there is still a balance to be drawn between assigning a low TTL to ensure that too many hosts do not use the information before revalidating, and assigning a higher TTL to limit the delay in repeatedly obtaining the same DNS information.

As discussed above, DNS is a hierarchical service, in which one DNS server can obtain information from another and then reuse that information until the TTL has expired. There is currently no control over whether the DNS server reuses this information to serve a small number of requests or a large number of requests. This results in what could be called a "hidden load" that can only be estimated using prior knowledge concerning a particular DNS server. For instance, a server associated with a high rate of usage would, if possible, be assigned a shorter TTL and/or directed to a host with greater capacity than a server having a more moderate rate of usage. In view of the foregoing considerations, a method and system are called for to address this hidden load problem.

SUMMARY OF THE INVENTION

It is an object of the present invention to provide a system and method that limit use of specific domain name system (DNS) information according to a quantity of clients and servers requesting this information.

It is another object of the present invention to provide a system and method that pass information concerning the quantity of clients and servers that have requested specific DNS information to a server that has been requested to provide this information.

A method of limiting reuse of domain name information in accordance with one form of the present invention, which incorporates some of the preferred features, includes the step of requesting domain name information by a local domain name server from an authoritative domain name server. The domain name information includes an allowable usage limit that represents a maximum number of times that the domain name information can be provided to a requestor, such as a client or server, before validating the domain name information.

A system for limiting reuse of domain name information formed in accordance with one form of the present invention, which incorporates some of the preferred features, includes an authoritative domain name server, a local domain name server, and at least one requestor, such as a client or server. The local domain name server is operatively coupled to the authoritative domain name server, and the requestor is operatively couple to the local domain name server.

The requestor requests domain name information from the local domain name server, and the local domain name server requests domain name information from the authoritative domain name server. The authoritative domain name server provides the domain name information in response to the local domain name server requesting domain name information. The domain name information includes an allowable usage limit, which represents a maximum number of times the domain name information can be provided to the requestor before validating the domain name information.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 3b is a flowchart of a fourth embodiment of the method of limiting reuse of domain name information in accordance with the present invention.

DETAILED DESCRIPTION

Figure 1:
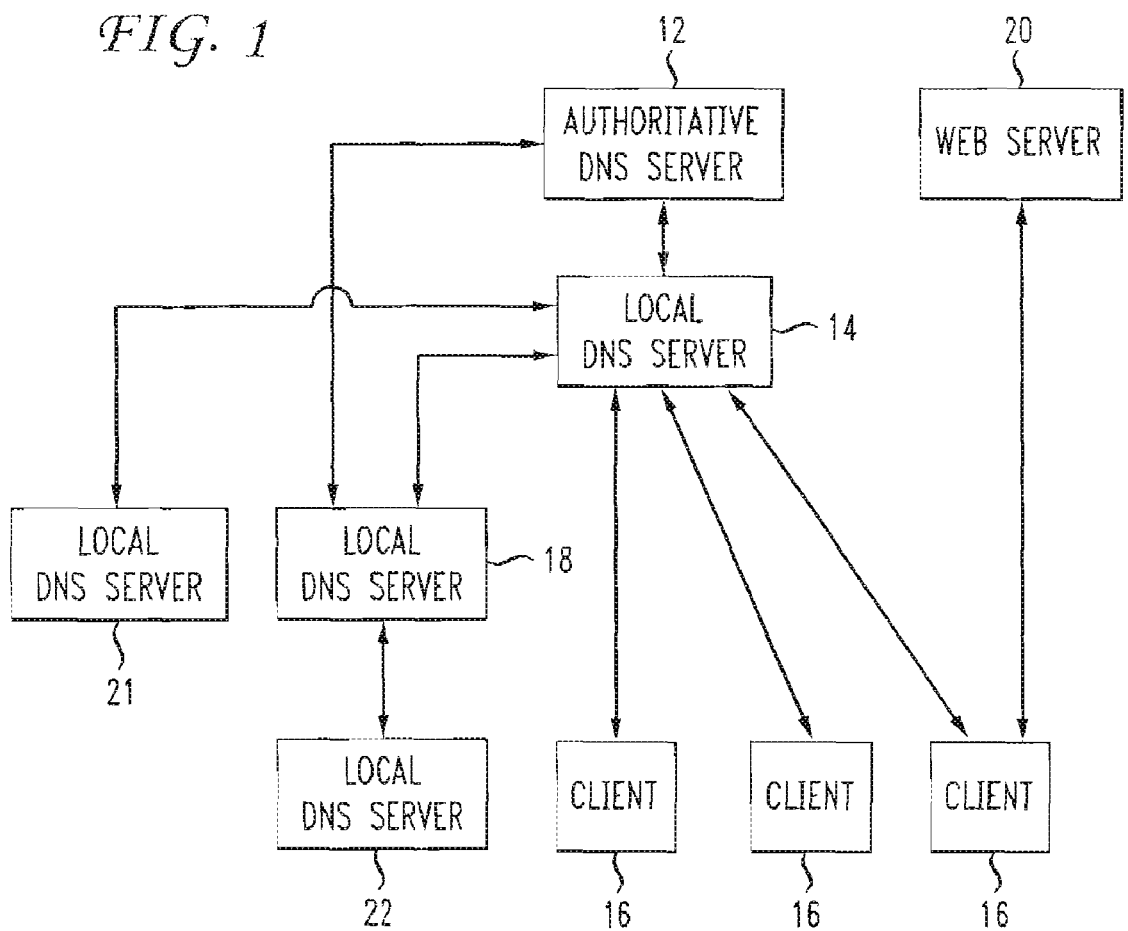
FIG. 1 is a block diagram of a system for limiting reuse of domain name information formed in accordance with the present invention.

Domain name system (DNS) information is generally requested from an authoritative DNS server by a local DNS sewer. The authoritative server responds by providing the DNS information to the local DNS server. The system and method in accordance with the present invention limit the reuse of domain name information by returning the requested DNS information with an allowable usage limit, in addition to the customary time-to-live (TTL) threshold to the local DNS sewer. The allowable usage limit represents the maximum number of times that the associated domain name information may be provided to requestors before it must be revalidated. The local DNS server can include a computer-readable storage medium that includes operational instructions, which can be executed by the local DNS server to limit the reuse of domain name information in accordance with the embodiments described herein.

The local DNS server returning the requested DNS information to a client preferably decrements a residual usage counter, which is a countdown of the allowable usage limit. The local DNS server that returns the requested DNS information to another DNS server would preferably issue a subset of its own allowable usage limit to the requesting server, and decrement its own residual usage counter by that portion of the allowable usage limit granted to the requesting server to ensure that the allowable usage limit remains constant.

In this way, the local DNS server preferably enables another DNS server to permit a maximum number of clients to use a particular IP address before revalidating. When the server at the requested IP address is lightly loaded, the number of uses and the duration of the TTL in the response are preferably relatively high. In contrast, when the server or other parts of the infrastructure, such as network or load-balancing switches, approach maximum capacity, the TTL is preferably more conservative.

Another embodiment in accordance with the present invention enables the DNS server requesting revalidation of DNS information to provide feedback information concerning the number times that the DNS information has been provided to other clients and servers as an observed usage count. This information is preferably used to improve the assignment of IP addresses to achieve improved load balancing of the network.

In the case of a plurality of IP addresses being assigned to one hostname, the same or different allowable usage limits may be assigned to the IP addresses associated with a particular hostname. The DNS server requesting the DNS information could then assign the IP addresses to other servers or clients randomly, sequentially (round robin), or probabilistically in accordance with weights assigned to each of the plurality of IP addresses. For example, in a probabilistic assignment, assume that there are two IP addresses, IPA1 and IPA2, assigned to a hostname. Further assume that IPA1 is assigned a weighting of 0.4 (40%) and that IPA2 is assigned a weighting of 0.6 (60%). The DNS server requesting the DNS information could then assign IPA1 to 40% of its requestors and assign IPA2 to 60% of its requestors.

FIG. 1 shows a system 10 for limiting reuse of DNS information. The system includes an authoritative DNS server 12 operatively coupled to a local DNS server 14. The local DNS server 14 is operatively coupled to other local DNS servers 18, 21, 22. The system also includes at least one client 16 that is operatively coupled to and requests DNS information from the local DNS server 14. The clients 16 preferably access a web server 20 using DNS information obtained from the authoritative DNS server 12, and one or more of the local DNS servers 14, 18, 21, 22. The authoritative DNS server 12, which returns a record or DNS information including a hostname-to-IP-address mapping, may realize that some local DNS servers tend to serve a large number of clients 16, and consequently may direct those servers to point their clients 16 at particular hosts that have unusually large capacity, and/or return a shorter than usual TTL.

Figure 2A:
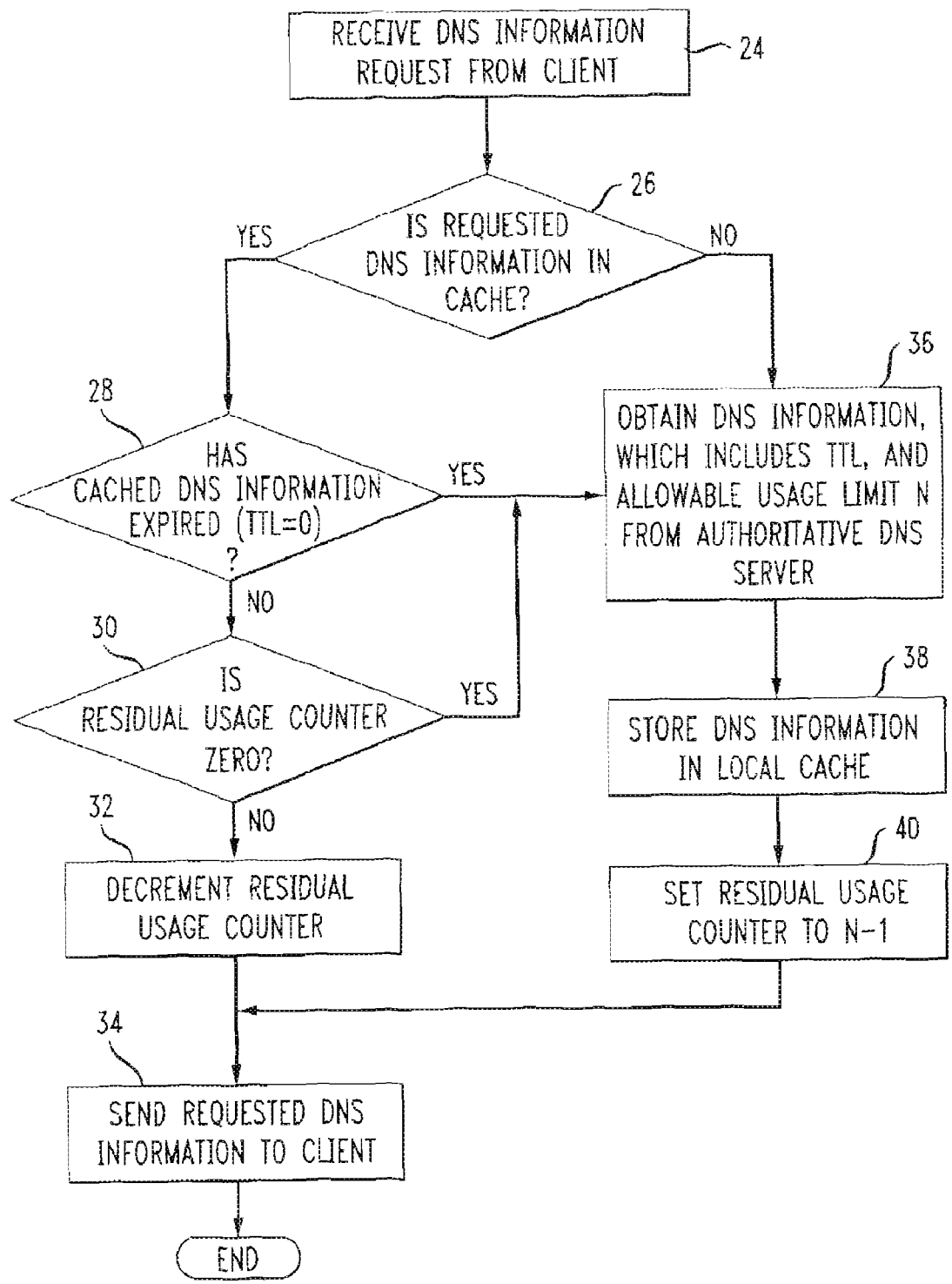
FIG. 2a is a flowchart of a first embodiment of a method of limiting reuse of domain name information in accordance with the present invention.

FIG. 2a is a flowchart of a first embodiment of a method of limiting reuse of domain name information in accordance with the present invention. In using the method, a client requests DNS information in the form of a record from the local DNS server. Upon receiving the DNS information request from the client in step 24, the local DNS server preferably determines whether the requested DNS information is in its cache in step 26. If the requested information is in cache, the local DNS server then determines whether the cached DNS information has expired in step 28, that is, the server determines whether the time to live (TTL) threshold associated with the DNS information is zero.

If the local DNS server determines that the cached DNS information has not expired in step 28, that is, the TTL value is not zero, the local DNS server determines the value of a residual usage counter in step 30. If the value of the residual usage counter is not zero, the local DNS server decrements the value of the residual usage counter in step 32, and provides the requested DNS information to the client that initially requested the information in step 34.

Alternatively, the local DNS server may determine that the requested DNS information is not cached in step 26, or if it is cached, that the cached DNS information has expired in step 28, or that although the TTL has not expired (TTL>0), the residual usage counter value is 0. In each of these circumstances, the local DNS server preferably requests and obtains the DNS information from the authoritative DNS server, which includes a new TTL and allowable usage limit N in step 36.

By providing the new TTL and allowable usage limit, the authoritative DNS server essentially eliminates the conditions that caused the local DNS server to request the information from the authoritative server. The TTL reflects the amount of time that the DNS information may exist before being revalidated. The residual usage counter value preferably reflects the number of times that the local DNS server may provide the domain name information to a requester, such as a client or another server.

Upon receipt of the requested DNS information from the authoritative DNS server, the local DNS server preferably stores the information in its local cache in step 38. The local DNS server then preferably sets the residual usage counter to N−1 in step 40, and sends the requested DNS information to the client in step 34. By setting the residual usage counter to N−1, the local DNS server decrements the residual usage count by one to account for the DNS information being providing to the requesting client for the first time in step 34.

Figure 2B:
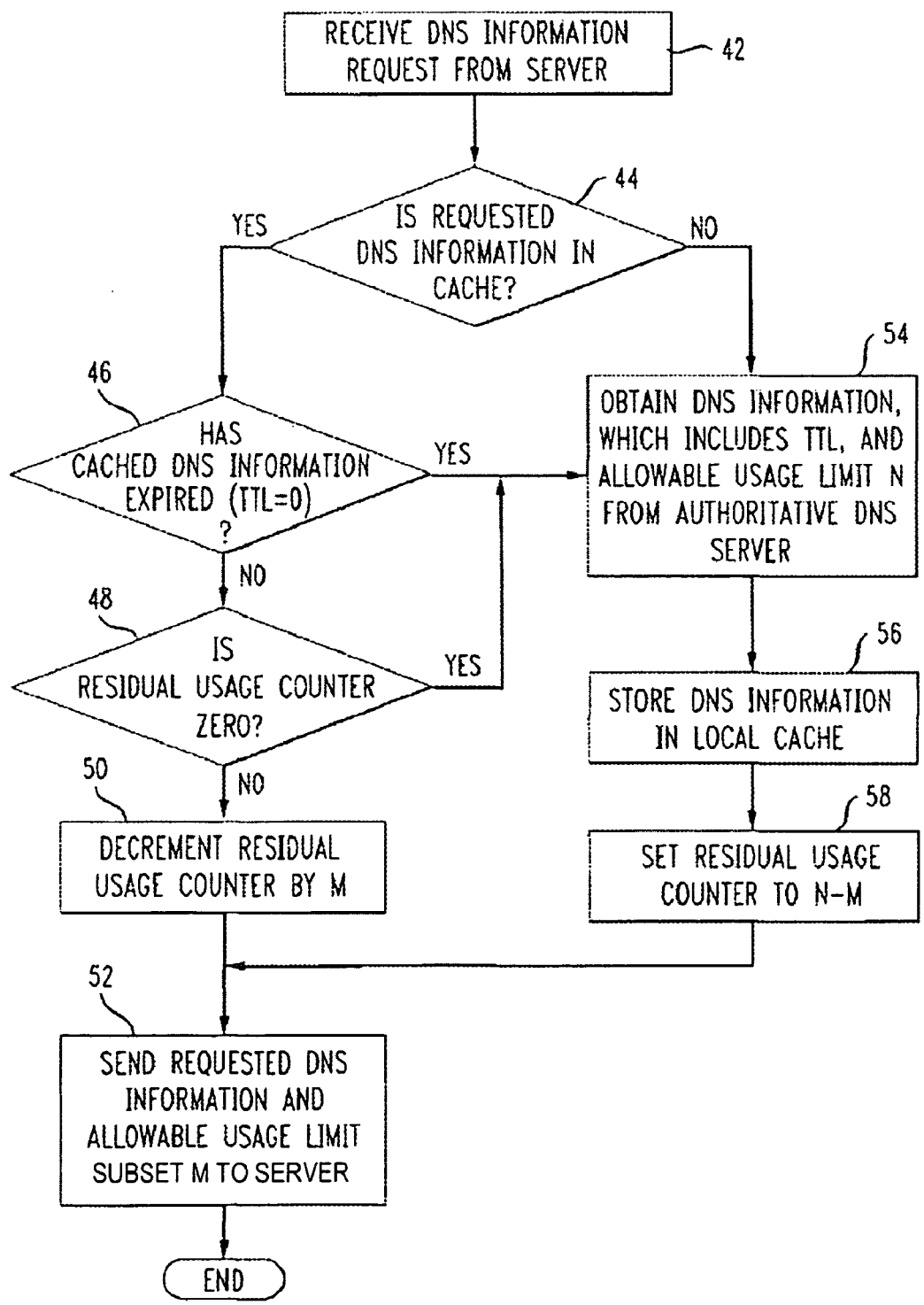
FIG. 2b is a flowchart of a second embodiment of the method of limiting reuse of domain name information in accordance with the present invention.

FIG. 2b represents a second embodiment of the method of limiting reuse of domain name information in accordance with the present invention, which is substantially similar to that shown in FIG. 2a, except that the DNS information is being requested by and provided to a server rather than a client. Specifically, in the embodiment shown in FIG. 2b, the initial request for DNS information preferably originates from a local DNS server to another local DNS server, such as from server 18, 21 to server 14 or from server 22 to server 18 shown in FIG. 1, rather than from the client 16 to the local DNS server 14.

As described above in reference to FIG. 2a, when the DNS server receives the request in step 42, the server preferably determines whether the requested information is already in its cache memory in step 44 of FIG. 2b. If the requested DNS information exists in cache, the DNS server determines that the TTL has not expired in step 46, and the residual usage counter value is not zero in step 48, then the DNS server preferably decrements the residual usage counter in step 50, and sends the requested information to the requesting DNS server in step 52.

However, in providing the DNS information, the DNS server also preferably sends an allowable usage limit subset M in step 52 associated with the requested information, which represents a portion of the allowable usage limit originally provided with the DNS information by the authoritative DNS server when first validated. The allowable usage limit M preferably reflects the number of requestors, which include clients and servers, to which the requesting DNS server may subsequently provide the corresponding information. Accordingly, the residual usage counter is preferably decremented by M in step 50 to represent that portion of the allowable usage counter being granted to the requesting DNS server in step 52.

In FIG. 2b, if the requested information does not exist in cache, and the local DNS server must obtain it from the authoritative server in step 44, the authoritative server sets the allowable usage limit N associated with the DNS information before sending it and the requested information to the local DNS server in step 54. Upon receiving the information from the authoritative server, the local DNS server preferably stores the information in cache in step 56, sets the residual usage counter to N−M in step 58, and sends the requested DNS information to the requesting DNS server with an allowable usage limit subset M, which represents a portion of the allowable usage limit N, in step 52. The requesting DNS server, which has received the requested information and the associated allowable usage limit subset M, preferably decrements M each time this information is provided to a requestor by an amount equal to the usage limit granted to that requestor.

Figure 3A:
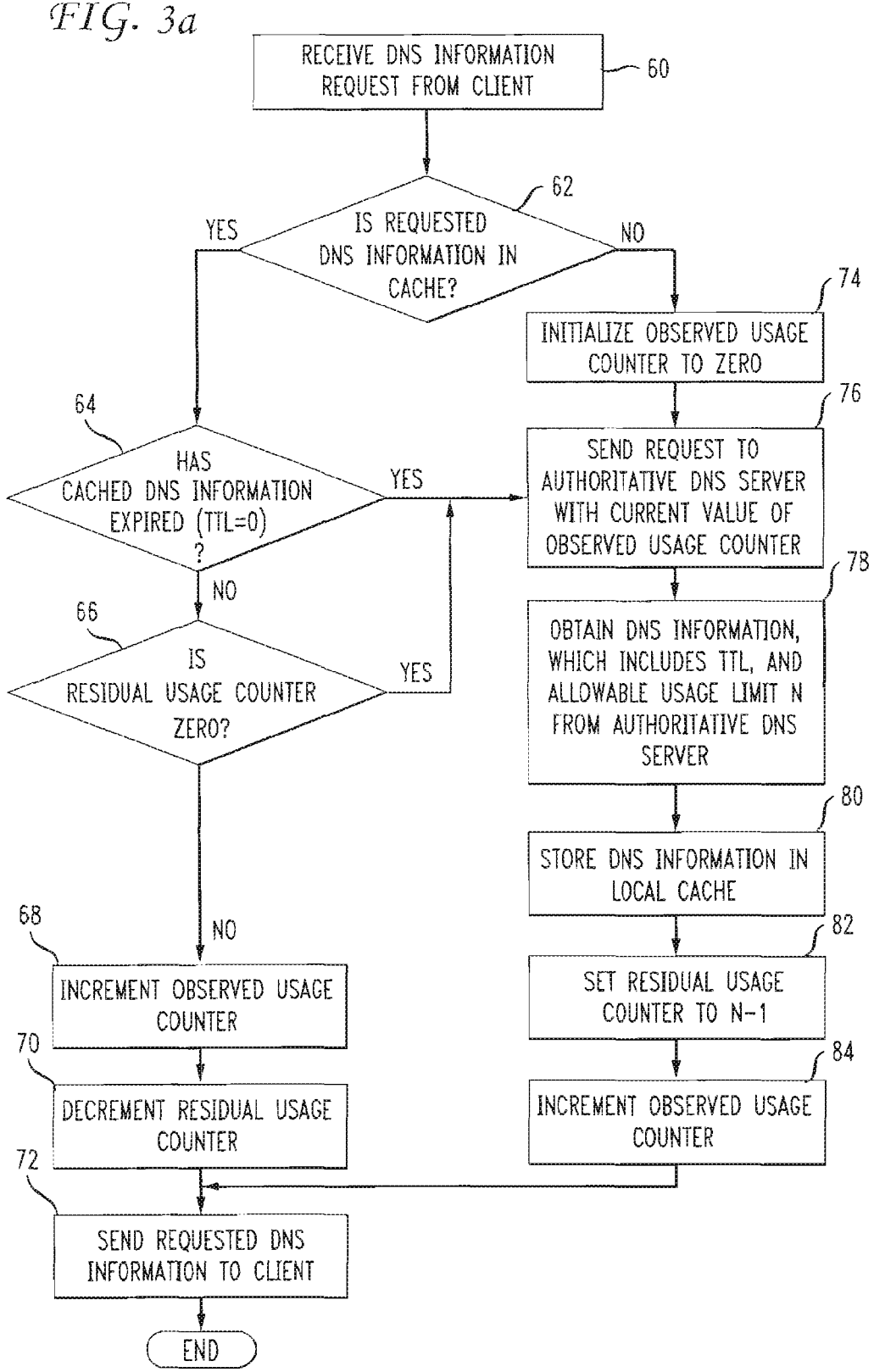
FIG. 3a is a flowchart of a third embodiment of the method of limiting reuse of domain name information in accordance with the present invention.

FIG. 3a shows a third embodiment of the method of limiting reuse of domain name information in accordance with the present invention. In this embodiment, when the local DNS server receives a request for DNS information from the client in step 60 and determines that the requested information is not in its cache in step 62, the server preferably initializes an observed usage counter associated with the requested information to zero in step 74.

The server then preferably sends a request for the DNS information to the authoritative DNS server with the current value of the observed usage counter in step 76. In response, the authoritative DNS server preferably provides the requested DNS information with the associated TTL value and the allowable usage limit N to the requesting client in step 78. Thus, the requesting DNS server essentially obtains information from the authoritative server that is defined by a set of three parameters, namely, TTL and the allowable usage limit N provided by the authoritative server, as well as the observed usage counter provided by the requesting server.

Thereafter, the DNS server preferably stores the information in its local cache in step 80 so that it is readily available for the next client requesting the same information. In storing the information in cache, the local DNS server preferably sets the associated residual usage counter to N−1 in step 82 to account for the fact that is it about to provide the information to the requesting client. The server also preferably increments the observed usage counter in step 84 to represent that the information is being provided to the requesting client. Thus, for every decrement in the residual usage counter, there is preferably an accompanying increment in the observed usage counter, and both figures represent the fact that the requested information is being provided to the requesting client in step 72.

If the requested DNS information is found to be in cache in step 62, and either the DNS information has expired in step 64, or the associated residual usage counter is zero in step 66, the server preferably requests the DNS information from the authoritative server and provides the current observed usage counter value to the authoritative server in step 76. If the requested DNS information is found to be in cache in step 62, the DNS information has not expired in step 64, and the associated residual usage counter is not zero in step 66, the observed usage counter is incremented in step 68 and the residual usage counter is decremented in step 70 to represent that the DNS information is being provided to the requesting client in step 72.

FIG. 3b is a flowchart of another embodiment in accordance with the present invention, which is substantially similar to that shown in FIG. 3a, except that the flowchart represents the viewpoint of a mid-level server, such as server 18 in FIG. 1, which receives a request for DNS information from a lower-level server, such as server 22 in FIG. 1. The mid-level server preferably forwards the request for DNS information to an upper-level server, such as server 14 or the authoritative server 12 shown in FIG. 1.

In step 86, the mid-level server preferably receives the DNS information request from the lower-level server with the allowable usage limit $N_L$ that the mid-level server previously granted to the lower-level server in response to the request from the lower-level server for the DNS information, a lower bound of the observed usage associated with the DNS information reported by the lower-level server $O_{L,low}$, and an upper bound of the observed usage associated with the DNS information reported by the lower-level server $O_{L,high}$. If, in step 88, the requested DNS information is not in the cache of the mid-level server, the value of the mid-level server variables corresponding to each of these variables is set to zero in step 90. The mid-level server then sends a request to the upper-level or authoritative server in step 92, which includes the current value of $N_M$, $O_{M,low}$, and $O_{M,high}$.

In step 94, the mid-level server preferably receives the requested information with the TTL and allowable usage limit N from the upper-level or authoritative server. The mid-level server then initializes its residual usage counter to N, initializes the upper bound of observed usage reported by the mid-level server $O_{high}$ to zero, and initializes the lower bound of observed usage reported by the mid-level server at the lower-level server $O_{low}$ to zero in step 96. The DNS information is stored in local cache in the mid-level server in step 98 with the allowable usage limit N.

In step 100, an allowable usage limit for the DNS information response to the lower-level server $N_{resp}$ is chosen as less than or equal to the residual usage counter. The value of $N_{resp}$ can be chosen based on such factors as the remaining TTL of the DNS response, the number of requestors, which may include clients and lower-level DNS servers, to which the requesting DNS server may subsequently provide the requested information, past history of usage by this and other requesting DNS servers, etc. The lower bound for the observed usage at the mid-level server $O_{low}$ is incremented by one, the upper bound for the observed usage at the mid-level server $O_{high}$ is incremented by the allowable usage limit for the DNS information response $N_{resp}$, and the residual usage counter is decremented by the allowable usage limit for the DNS information response $N_{resp}$ in step 102.

Thus, the lower bound for the observed usage at the mid-level server $O_{low}$ now indicates that the DNS information has been provided to at least one requestor, the lower-level server. The upper bound for the observed usage at the mid-level server $O_{high}$ now indicates that the maximum number of requestors the DNS information can be provided to is equal to the allowable usage limit $N_{resp}$ granted to the lower-level server. The residual usage counter now indicates the remaining usage that may be granted to additional requestors. The requested DNS information is then sent to the lower-level server with the allowable usage limit for the DNS information response $N_{resp}$ in step 104.

If the requested DNS information is in cache in step 88 and either the cached information has expired in step 106 or the residual usage counter is zero in step 108, the mid-level server variables are initialized in step 110. Specifically, $N_M$ is initialized to N, $O_{M,low}$ is initialized to $O_{low}$, and $O_{M,high}$ is initialized to $O_{high}$. If the requested DNS information is in cache in step 88, the cached information has not expired in step 106, and the residual usage counter is not zero in step 108, the residual usage counter and upper and lower bounds associated with the lower-level server are set as follows in step 112:

$$O_{low} := O_{low} - 1 + O_{L,low} \quad (1);$$

$$O_{high} := O_{high} - N_L + O_{L,high} \quad (2); \text{ and}$$

$$RUC := RUC + N_L - O_{L,high} \quad (3).$$

$O_{low}$ is decremented by (1) in equation 1, $O_{high}$ is decremented by $N_L$ in equation (2), and $N_L$ is added to RUC in equation (3) since corresponding values (1, $N_{resp}$, $N_{resp}$) were applied by the mid-level server to $O_{low}$, $O_{high}$, and RUC as presumed values for the lower-level server in step 102. In step 112, the lower-level server is reporting observed values, which are being substituted for the values presumed in step 102. The method then preferably continues with step 100 as described above.

In accordance with the present invention, the use of DNS information is preferably limited by the number of requestors to which the information has been provided (allowable usage limit). In addition, a request for revalidation of DNS information provides information concerning the number of requestors to which the DNS information has been provided (observed usage count).

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of limiting reuse of domain name information, the method comprising:
   receiving domain name information at a first domain name server (DNS) machine, the domain name information comprising a time limit and a request limit associated with subsequent distribution of the domain name information to at least one requestor; and
   validating the received domain name information from a second DNS machine based on earliest expiration of the time limit and the request limit.

2. The method of claim 1, further comprising distributing the domain name information to the at least one requestor while the time limit and the request limit have not expired.

3. The method of claim 2, wherein distributing the domain name information comprises:
   receiving a request for the domain name information from a requestor;
   determining whether the time limit has expired;
   determining whether the request limit has expired; and transmitting the domain name information to the requestor if the time limit and the request limit have not expired.

4. The method of claim 1, wherein receiving domain name information comprises:
caching the domain name information at the first DNS machine;
initiating a timer associated with the domain name information in accordance with the time limit; and
initializing a counter associated with the domain name information in accordance with the request limit.

5. The method of claim 4, further comprising:
receiving a request for the domain name information from a requestor;
determining whether the timer has reached the time limit; and
determining whether the counter has reached the request limit.

6. The method of claim 5, further comprising:
transmitting the cached domain name information to the requestor if the timer has not reached the time limit and the counter has not reached the request limit; and
updating the counter to reflect the transmission of the cached domain name information to the requestor.

7. The method of claim 5, wherein validating the domain name information comprises:
requesting validated domain name information from the second DNS machine if the timer has reached the time limit or the counter has reached the request limit;
updating the cached domain name information with the validated domain name information;
initiating the timer in accordance with a time limit of the validated domain name information; and
initializing the counter in accordance with a request limit of the validated domain name information.

8. The method of claim 7, further comprising:
transmitting the updated cached domain name information to the requestor if the timer has not reached the time limit and the counter has not reached the request limit; and
updating the counter to reflect the transmission of the updated cached domain name information to the requestor.

9. The method of claim 1, wherein the at least one requestor is one or more of a mid-level DNS sewer, a local DNS machine, and a client.

10. The method of claim 1, wherein the second DNS machine from which the domain name information is validated is one of an authoritative DNS machine, mid-level DNS machine, and a local DNS machine.

11. A domain name server to limit reuse of domain name information, the domain name server comprising a computer-readable storage medium, the computer-readable storage medium comprising operational instructions that, when executed by the domain name server, cause the domain name server to:
receive domain name information at the domain name server, the domain name information comprising a time limit and a request limit associated with subsequent distribution of the domain name information to at least one requestor; and
validate the received domain name information from a second domain name server based on earliest expiration of the time limit and the request limit.

12. The domain name server of claim 11, wherein the computer-readable storage medium further comprises operational instructions that, when executed by the domain name server, cause the domain name server to distribute the domain name information to the at least one requestor while the time limit and the request limit have not expired.

13. The domain name server of claim 12, wherein the operational instructions that cause the domain name server to distribute the domain name information further comprise operational instructions that, when executed by the domain name server, cause the domain name server to:
receive a request for the domain name information from a requestor;
determine whether the time limit has expired;
determine whether the request limit has expired; and
transmit the domain name information to the requestor if the time limit and the request limit have not expired.

14. The domain name server of claim 11, wherein the operational instructions that cause the domain name server to receive domain name information further comprise operational instructions that, when executed by the domain name server, cause the domain name server to:
cache the domain name information at the domain name sewer;
initiate a timer associated with the domain name information in accordance with the time limit; and
initialize a counter associated with the domain name information in accordance with the request limit.

15. The domain name server of claim 14, wherein the computer-readable storage medium further comprises operational instructions that, when executed by the domain name server, cause the domain name server to:
receive a request for the domain name information from a requestor;
determine whether the timer has reached the time limit; and
determine whether the counter has reached the request limit.

16. The domain name server of claim 15, wherein the operational instructions that cause the domain name server to distribute the domain name information further comprise operational instructions that, when executed by the domain name server, cause the domain name server to:
transmit the cached domain name information to the requestor if the timer has not reached the time limit and the counter has not reached the request limit; and
update the counter to reflect the transmission of the cached domain name information to the requestor.

17. The domain name server of claim 15, wherein the operational instructions that cause the domain name server to validate the domain name information further comprise operational instructions that, when executed by the domain name server, cause the domain name server to:
request validated domain name information from the second domain name server if the timer has reached the time limit or the counter has reached the request limit;
update the cached domain name information with the validated domain name information;
initiate the timer in accordance with a time limit of the validated domain name information; and
initialize the counter in accordance with a request limit of the validated domain name information.

18. The domain name server of claim 17, wherein the computer-readable storage medium further comprises operational instructions that, when executed by the domain name server, cause the domain name server to:
transmit the updated cached domain name information to the requestor if the timer has not reached the time limit and the counter has not reached the request limit; and
update the counter to reflect the transmission of the updated cached domain name information to the requestor.

19. The domain name server of claim 11, wherein the at least one requestor is one or more of a mid-level domain name server, a local domain name server, and a client.

20. The domain name server of claim 11, wherein the second domain name server from which the domain name information is validated is one of an authoritative domain name server, mid-level domain name server, and a local domain name server.

* * * * *